(12) United States Patent
Liu

(10) Patent No.: US 9,306,443 B2
(45) Date of Patent: Apr. 5, 2016

(54) ANALOG PHOTOVOLTAIC POWER CIRCUIT WITH AUTO ZERO CALIBRATION

(71) Applicant: Jing-Meng Liu, Zhubel (TW)

(72) Inventor: Jing-Meng Liu, Zhubel (TW)

(73) Assignee: RICHTEK TECHNOLOGY CORPORATION, R.O.C, Chupei, Hsinchu (TW)

(*) Notice: Subject to any disclaimer, the term of this patent is extended or adjusted under 35 U.S.C. 154(b) by 307 days.

(21) Appl. No.: 14/023,900

(22) Filed: Sep. 11, 2013

(65) Prior Publication Data
US 2014/0077757 A1 Mar. 20, 2014

Related U.S. Application Data

(60) Provisional application No. 61/700,897, filed on Sep. 14, 2012.

(51) Int. Cl.
| | |
|---|---|
| *H02J 7/04* | (2006.01) |
| *H02J 7/16* | (2006.01) |
| *H02M 1/08* | (2006.01) |
| *H02J 3/38* | (2006.01) |

(52) U.S. Cl.
CPC ............ *H02M 1/08* (2013.01); *H02J 3/385* (2013.01); *Y02E 10/58* (2013.01)

(58) Field of Classification Search
USPC ........................................... 320/156
See application file for complete search history.

(56) References Cited

U.S. PATENT DOCUMENTS

| | | | |
|---|---|---|---|
| 8,354,820 B2* | 1/2013 | Liu | G05F 1/67 320/101 |
| 8,853,994 B2 | 10/2014 | Liu | |

OTHER PUBLICATIONS

Behzad Razavi, Design of Analog CMOS Integrated Circuits, ISBN:986-157-164-7; Nov. 2005; McGraw-Hill Int'l Enterprises Inc., Taipei, Taiwan.
Fig. 5 cited in "On/Off controlled solar cell MPPT controller", China Academic Journal Electronic Publishing House, Electrical measurement & Instrumentation, vol. 46 No. 521, May 2009—by Zhang Chun-Long, Liao Zhi-Ling, Liu Guo-Hai (1. Department of Electronic Engineering, Nantong Vocational College, Nantong 22607, Jiangsu, China. 2. School of Electrical and Information, Jiangsu University, Zhenjiang 212013, Jiangsu, China).

* cited by examiner

*Primary Examiner* — Eric Lee
(74) *Attorney, Agent, or Firm* — Tung & Associates

(57) ABSTRACT

The invention provides an analog photovoltaic power circuit with auto zero calibration, which judges whether the current trend or voltage trend has the same direction as or different direction from the power trend, and adjusts an input/output power conversion accordingly, so that an input current approaches to an optimum current corresponding to a maximum power point, in which the judgments of the current trend, voltage trend and power trend is calibrated with autozero circuitry.

13 Claims, 13 Drawing Sheets

ANALOG PHOTOVOLTAIC POWER CIRCUIT WITH AUTO ZERO CALIBRATION

CROSS REFERENCE

The present invention claims priority to U.S. 61/700,867, filed on Sep. 13, 2012.

BACKGROUND OF THE INVENTION

1. Field of Invention

The present invention relates to a photovoltaic power circuit, such as a solar cell circuit, in particular to a photovoltaic power circuit comprising analog devices and has an auto zero calibration function; the photovoltaic power circuit has a much simpler structure than conventional digital photovoltaic power circuit.

2. Description of Related Art

More and more advanced countries are devoting research resources to solar cell circuits, in view of energy crisis. Solar cell circuits belong to the family of photovoltaic power circuits. A photovoltaic power circuit functions by means of the characteristics of semiconductor PN junctions. The PN junctions transfer the received photo energy to electric energy, and charge a battery with the electric energy so that it can generate power. FIG. 1 shows the V-I (voltage-current) relationship for a PN junction diode to generate electric energy, in which the solid line represents the relationship between voltage and current, and the dot line represents the product of voltage and current (V*I), i.e., power. The figure shows only one curve because it is assumed that the received photo energy remains unchanged. If the received photo energy changes, the curve correspondingly changes.

As shown by the curve in FIG. 1, the maximum voltage point Voc is at the open circuit point, while the maximum current point Isc is at the short circuit point. However, the maximum power output point is neither at the maximum voltage point nor at the maximum current point, but at a maximum power point MPP, with corresponding optimum voltage Vmpp and optimum current Impp. Because the received photo energy often keeps varying, prior art digital photovoltaic power circuits have to make complicated calculation, by sophisticated digital circuit, to extract the electric energy at the MPP corresponding to the received photo energy.

An example of such prior art digital photovoltaic power circuit is disclosed in U.S. Pat. No. 6,984,970, which is shown in FIG. 2 in a simplified form. The voltage Vin generated by a photovoltaic device 2 is converted to output voltage Vout by a power stage 3, to be supplied to a load 4. The load 4 for example can be a charging battery, and the power stage 3 for example can be a boost converter, a buck converter, an inverting converter, a fly-back converter, etc. To keep the power stage 3 extracting electric energy at the MPP, a digital controller 5 is provided in the circuit, which includes a digital calculation module 51 (e.g., a digital microcontroller) that keeps multiplying the value of the voltage Vin with the value of the extracted current I to obtain the MPP, and further calculates the optimum voltage Vmpp based on the obtained MPP. The calculated voltage Vmpp is compared with the input voltage Vin, and the comparison result drives a controller circuit 52 to control the power stage 3. The digital controller 5 shown in FIG. 2 is very sophisticated; it requires a huge number of transistors, and it requires analog-to-digital converters (ADC) to capture voltage and current signals. Inevitably, this increases difficulties and cost of the circuit and its design.

Another prior art digital photovoltaic power circuit is disclosed in US Patent Publication No. 2006/0164065. This prior art only briefly explains the idea that the circuit includes a search mode and a dithering mode. In the initial search mode, the circuit sweeps the voltage-current curve to find the MPP; thereafter, it enters the dithering mode in which it operates according to the current value corresponding to the MPP, and periodically samples and updates the vale (for details, please refer to paragraphs 0008, 0010, 0033 and FIG. 5 of the patent publication). However, this cited patent publication does not explain how it "sweeps" to find the MPP.

Although there is no detailed circuit structure illustrating how it sweeps, it can be seen from the description relating to the search mode and the sweeping process that this cited patent publication, even if it does not require multiplication of multiple voltage and current values (in fact one can not see how it omits such complicated calculation from the specification of this cited patent publication), requires many digital circuits such as memories or registers and comparators; otherwise it can not select and memorize the maximum power point MPP. In addition to the complexity of the circuit, the sweeping process proposed by this cited patent publication occupies effective operation time of the circuit. Moreover, if light intensity changes after initialization, causing the photovoltaic device to deviate from the original voltage-current curve, the circuit has to reinitiate the search mode with the sweeping process, which is very inefficient.

In brief, US Patent Publication No. 2006/0164065 requires a complicated circuit and an inefficient process to find the MPP point, so that it can operate in the dithering mode in an analogous manner. Obviously this is disadvantageous.

SUMMARY OF THE INVENTION

In view of the foregoing, it is desirous, and thus an object of the present invention, to provide an analogue photovoltaic power circuit that improves the drawbacks in prior art.

From one perspective, the present invention provides a photovoltaic power circuit with auto zero calibration, for converting an input current and an input voltage generated by a photovoltaic device to an output current and an output voltage, the photovoltaic power circuit comprising: a trend judgment circuit having a storage mode and a comparison mode, the trend judgment circuit including: a current trend indicator circuit for judging a slope direction of the input current at a present time point as compared with the input current at a previous time point in the comparison mode to generate a current trend signal, or a voltage trend indicator circuit for judging a slope direction of the input voltage at the present time point as compared with the input voltage at the previous time point in the comparison mode to generate a voltage trend signal; a power trend indicator circuit for judging a slope direction of the power at the present time point as compared with the power at the previous time point according to the input current and the input voltage in the comparison mode to generate a power trend signal; and a trend comparison circuit for generating a trend comparison result according to the current trend signal and the power trend signal, or according to the voltage trend signal and the power trend signal; and a power output control circuit which is coupled to the photovoltaic device at an input terminal and extracts electric energy at the input terminal to generate the output current and the output voltage at an output terminal, the power output control circuit adjusts the power conversion from the input terminal to the output terminal directly or indirectly according to an output from the trend judgment circuit so that the input current approaches an optimum current of the photovoltaic device. The trend judgment circuit alternatingly operates in the storage mode and the comparison mode according to a clock signal.

In a preferable embodiment, the power output control circuit is a battery charger circuit which regulates the charging current directly or indirectly according to the output from the trend judgment circuit so that the input current approaches an optimum current of the photovoltaic device.

In a preferable embodiment, the current trend indicator circuit stores a signal related to the input current at a storage time point in the storage mode, for comparison when the trend judgment circuit enters the comparison mode next time, and in the comparison mode, the current trend indicator circuit compares the signal related to the input current at the present time point with the previously stored signal related to the input current to generate the current trend signal; or the voltage trend indicator circuit stores a signal related to the input voltage at a storage time point in the storage mode, for comparison when the trend judgment circuit enters the comparison mode next time, and in the comparison mode, the voltage trend indicator circuit compares the signal related to the input voltage at the present time point with the previously stored signal related to the input voltage to generate the voltage trend signal.

In a preferable embodiment, the current trend indicator circuit includes a first comparison and amplification circuit for comparing the signal related to the input current at the present time point with the previously stored signal related to the input current, wherein when the first comparison and amplification circuit has an offset, the offset is stored together with the signal related to the input current at the storage time point in the storage mode, whereby the offset is cancelled during the comparison performed by the first comparison and amplification circuit in the comparison mode; or the voltage trend indicator circuit includes a second comparison and amplification circuit for comparing the signal related to the input voltage at the present time point with the previously stored signal related to the input voltage, wherein when the second comparison and amplification circuit has an offset, the offset is stored together with the signal related to the input voltage at the storage time point in the storage mode, whereby the offset is cancelled during the comparison performed by the second comparison and amplification circuit in the comparison mode.

In a preferable embodiment, the current trend indicator circuit includes: a first comparison and amplification circuit having an input terminal for receiving a signal related to the input current; a capacitor having a high voltage terminal coupled to another input terminal of the first comparison and amplification circuit; and a switch coupled between an output terminal of the first comparison and amplification circuit and the high voltage terminal of the capacitor, the switch being controlled by a clock signal; or the voltage trend indicator circuit includes: a second comparison and amplification circuit having an input terminal for receiving a signal related to the input voltage; a capacitor having a high voltage terminal coupled to another input terminal of the second comparison and amplification circuit; and a switch coupled between an output terminal of the second comparison and amplification circuit and the high voltage terminal of the capacitor, the switch being controlled by the clock signal.

In a preferable embodiment, the power trend indicator circuit stores a signal related to the power at a storage time point in the storage mode, for comparison when the trend judgment circuit enters the comparison mode next time, and in the comparison mode, the power trend indicator circuit compares the signal related to the power at the present time point with the previously stored signal related to the power to generate the power trend signal.

In a preferable embodiment, the power trend indicator circuit includes: an analog multiplication circuit for receiving a signal related to the input current and a signal related to the input voltage, and multiplying them to obtain a signal related to power; a comparison and amplification circuit having an input terminal for receiving the signal related to power; a capacitor having a high voltage terminal coupled to another input terminal of the comparison and amplification circuit; and a switch coupled between an output terminal of the comparison and amplification circuit and the high voltage terminal of the capacitor, the switch being controlled by a clock signal In a preferable embodiment, the power trend indicator circuit stores a signal related to the input current and a signal related to the input voltage at a storage time point in the storage mode, for comparison when the trend judgment circuit enters the comparison mode next time; the power trend indicator circuit including a multiplication and comparison and amplification circuit for generating a signal related to power according to the signal related to the input current and the signal related to the input voltage, and in the comparison mode, the multiplication and comparison and amplification circuit compares the signal related to power at the present time point with the signal related to power at the previous time point to generate the power trend signal.

In a preferable embodiment, when the multiplication and comparison and amplification circuit has an equivalent total offset, the equivalent total offset is stored together with the signal related to the input current and the signal related to the input voltage at the storage time point in the storage mode, whereby the equivalent total offset is cancelled during the comparison performed by the multiplication and comparison and amplification circuit in the comparison mode.

In a preferable embodiment, the power trend indicator circuit includes: a first and a second switches controlled by a clock signal; a first capacitor coupled to a signal related to the input voltage through the first switch, for storing the signal related to the input voltage when the first switch is conductive; a second capacitor coupled to a signal related to the input current through the second switch, for storing the signal related to the input current when the second switch is conductive; a current source; a first transistor controlled by the signal related to the input current at the previous time point and having one terminal coupled to the current source; a second transistor controlled by the signal related to the input current at the present time point and having one terminal coupled to the current source, wherein the first and second transistors compete for distribution of a current of the current source; a third and a fourth transistors controlled by the signal related to the input voltage at the present time point; a fifth and a sixth transistors controlled by the signal related to the input voltage at the present time point, wherein each of the third and the fifth transistors has one terminal coupled to another terminal of the first transistor, and the third and the fifth transistors compete for distribution of a current flowing through the first transistor, and wherein each of the fourth and the sixth transistors has one terminal coupled to another terminal of the second transistor, and the fourth and the sixth transistors compete for distribution of a current flowing through the second transistor; a first current mirror circuit obtaining a first sum of currents flowing through the third and the fourth transistors and duplicating the first sum to generate a first signal; and a second current mirror circuit obtaining a second sum of currents flowing through the fifth and the sixth transistors and duplicating the second sum to generate a second signal; wherein a comparison between the first signal and the second signal shows a power trend.

In a preferable embodiment, the power trend indicator circuit includes: a first and a second switches controlled by a clock signal; a first capacitor coupled to a signal related to the input voltage through the first switch, for storing the signal related to the input voltage when the first switch is conductive; a second capacitor coupled to a signal related to the input current through the second switch, for storing the signal related to the input current when the second switch is conductive; a current source; a first transistor controlled by the signal related to the input current at the previous time point and having one terminal coupled to the current source; a second transistor controlled by the signal related to the input current at the present time point and having one terminal coupled to the current source, wherein the first and second transistors compete for distribution of a current of the current source; a third and a fourth transistors controlled by the signal related to the input voltage at the present time point; a fifth and a sixth transistors controlled by the signal related to the input voltage at the present time point, wherein each of the third and the fifth transistors has one terminal coupled to another terminal of the first transistor, and the third and the fifth transistors compete for distribution of a current flowing through the first transistor, and wherein each of the fourth and the sixth transistors has one terminal coupled to another terminal of the second transistor, and the fourth and the sixth transistors compete for distribution of a current flowing through the second transistor; a first current mirror circuit obtaining a first sum of currents flowing through the third and the sixth transistors and duplicating the first sum to generate a first signal; and a second current mirror circuit obtaining a second sum of currents flowing through the fourth and the fifth transistors and duplicating the second sum to generate a second signal; wherein a comparison between the first signal and the second signal shows a power trend.

In a preferable embodiment, the trend comparison circuit includes a logic gate, and the trend comparison circuit may further include a first hysteresis circuit having an input terminal for receiving the current trend signal or the voltage trend signal, and an output terminal coupled to an input terminal of the logic gate; and a second hysteresis circuit having an input terminal for receiving the power trend signal, and an output terminal coupled to another input terminal of the logic gate.

In one preferable embodiment, the trend judgment circuit further includes a state-over-time integrator circuit for integrating the trend comparison result from the trend comparison circuit to generate a state-over-time integration output.

In one preferable embodiment, the state-over-time integrator circuit includes: a first current source coupled between a voltage supply and a common node for supplying charges; a second current source coupled between the common node and ground for discharging charges; a capacitor having a high voltage terminal coupled to the common node; a first switch coupled to the first current source for determining whether to charge the capacitor by the first current source according to the trend comparison result; and a second switch coupled to the second current source for determining whether to discharge the capacitor by the second current source according to the trend comparison result.

In one preferable embodiment, the state-over-time integrator circuit further includes a third switch coupled between the high voltage terminal of the capacitor and the common node, the third switch being controlled by a clock signal.

In one preferable embodiment, the state-over-time integrator circuit further includes a source follower circuit coupled to the high voltage terminal of the capacitor and the common node.

In one preferable embodiment, the state-over-time integrator circuit further includes an emitter follower circuit coupled to the high voltage terminal of the capacitor and the common node.

In one preferable embodiment, the state-over-time integrator circuit further includes a voltage-controlled current source coupled to the high voltage terminal of the capacitor and controlled by the voltage of the capacitor.

In one preferable embodiment, the state-over-time integrator circuit further includes a voltage-controlled resistor coupled to the high voltage terminal of the capacitor and controlled by the voltage of the capacitor.

In one preferable embodiment, the photovoltaic power circuit further comprises a gain adjustment circuit coupled between the output of the state-over-time integrator circuit and the power output control circuit, for adjusting a weighting of the output from the state-over-time integrator circuit as a control factor to the power output control circuit.

In one preferable embodiment, the state-over-time integration output from the state-over-time integrator circuit is a voltage signal, and the gain adjustment circuit is a voltage scaling circuit for multiplying the state-over-time integration output by a first gain, or a voltage-to-current converter with an adjustable ratio for multiplying the state-over-time integration output by a second gain and converting the product to a current signal.

In one preferable embodiment, the state-over-time integration output from the state-over-time integrator circuit is a current signal, and the gain adjustment circuit is a current scaling circuit for multiplying the state-over-time integration output by a first gain, or a current-to-voltage converter with an adjustable ratio for multiplying the state-over-time integration output by a second gain and converting the product to a voltage signal.

The objectives, technical details, features, and effects of the present invention will be better understood with regard to the detailed description of the embodiments below.

DESCRIPTION OF THE PREFERRED EMBODIMENTS

One of the features of the present invention is that it uses analog circuit devices, which are much simpler than the devices in prior art, to calculate the maximum power point MPP in a photovoltaic power circuit. The circuit according to the present invention is thus called "analog photovoltaic power circuit". However, it should be understood that the term "analog photovoltaic power circuit" only means that the key functions of the circuit are achieved by analog devices; it does not mean that all of the circuit devices are analog devices.

Figure 3:
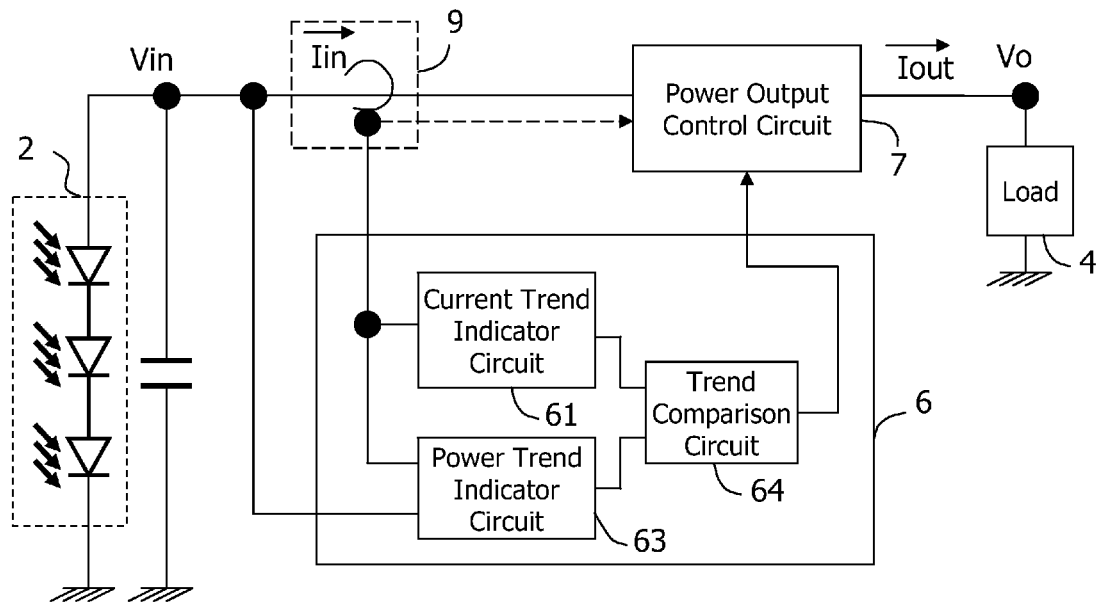
FIGS. 3-6 show four embodiments of the present invention.

Please refer to FIG. 3 which is a schematic circuit diagram showing a first embodiment according to the present invention. As shown in the figure, a photovoltaic device group 2 generates electric energy, and the voltage generated by the photovoltaic device group 2 is supplied to a power output control circuit 7 as its input voltage Vin. In terms of structure, the power output control circuit 7 for example can be a boost converter, a buck converter, an inverting converter, a fly-back converter, a linear converter, etc. (including the power devices and a control circuit controlling the power devices). The power output control circuit 7 extracts electric energy from the input terminal and supplies an output current Iout to the output terminal, thereby generating an output voltage Vout which is supplied to a load 4. The load for example can be a battery, or any other circuit. When the load 4 is a battery, in terms of function, the power output control circuit 7 becomes a battery charger circuit; in a preferable embodiment, the battery charger circuit has different and switchable control modes, for example a constant voltage control mode (wherein the regulation target is a constant voltage), a constant current control mode (wherein the regulation target is a constant current), or other control modes. A current detection circuit 9 detects an input current Iin, and transmits information related to the input current Iin (hereinafter "Iin related signal") to a trend judgment circuit 6. The power output control circuit 7 directly or indirectly receives a signal generated by the trend judgment circuit 6, and correspondingly adjusts the conversion from its input to its output, so as to control the input current Iin to track the optimum current Impp corresponding to the maximum power point MPP, or to control input voltage Vin to track the optimum voltage Vmpp corresponding to the maximum power point MPP (referring to FIG. 1), whereby the output current Iout (or a charging current to the load 4 if the load 4 is a battery) is regulated accordingly. The photovoltaic power circuit of the present invention operates by a manner as described below.

Figure 1:
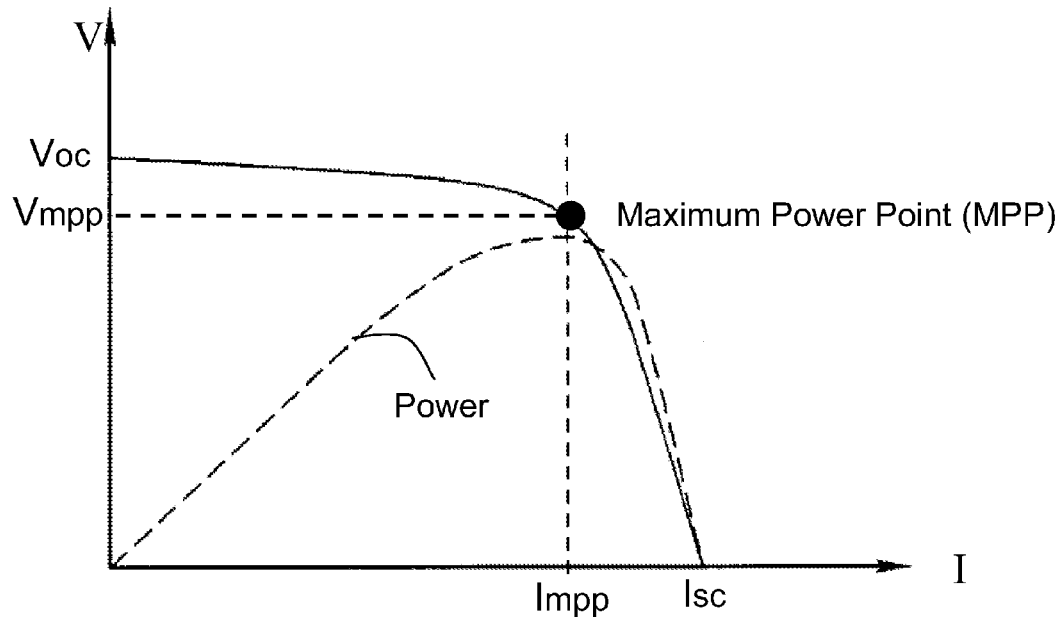
FIG. 1 shows the voltage-current relationship for a photovoltaic device under the same photo energy.
Figure 2:
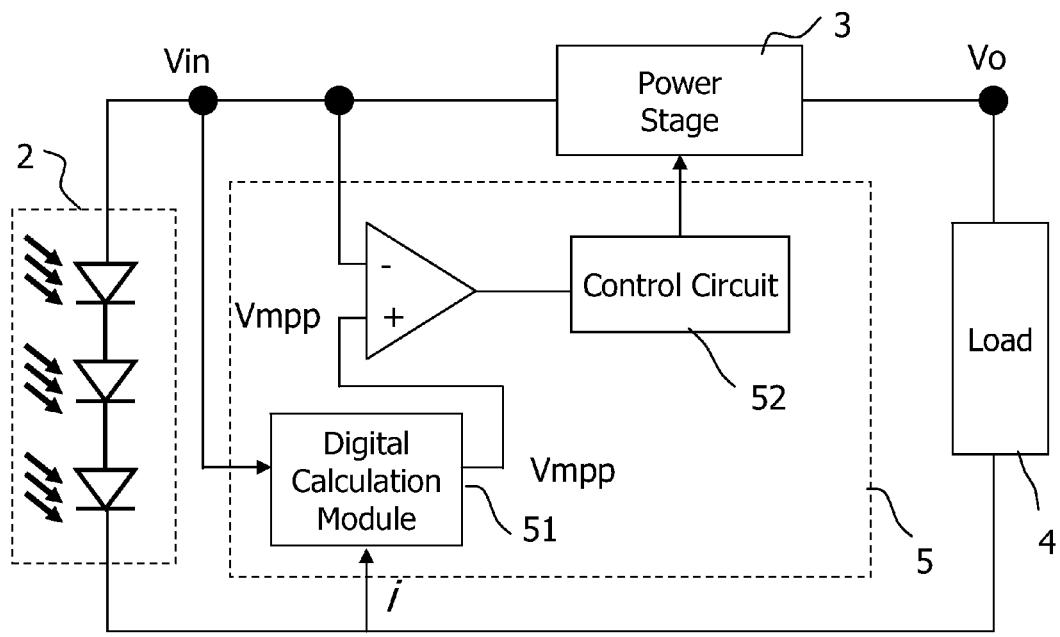
FIG. 2 is a schematic circuit diagram showing a prior art photovoltaic power circuit.

Please refer to the voltage-current curve shown in FIG. 1. At the left side of the MPP, when the current increases, the power increases; the current and the power change along the same direction (i.e., the slopes of the current and the power have the same direction). At the right side of the MPP, when the current increases, the power decreases; the current and the power change along opposite directions (i.e., the slopes of the current and the power have opposite directions). Thus, we can compare the slope (or trend) of the current outputted from the photovoltaic device group 2 (corresponding to the input current Iin) and the slope (or trend) of the power, to determine whether the present situation is located at the left side or right side of the MPP, and correspondingly adjust the power conversion from the input to the output, so that the input current Iin approaches the optimum current Impp corresponding to the maximum power point MPP, or so that the input voltage Vin approaches the optimum voltage Vmpp corresponding to the maximum power point MPP. In the following embodiments, as examples, we will explain the method controlling the input current Iin to track the optimum current Impp, but as explained in the above, it is equivalent to control the input voltage Vin to track the optimum voltage Vmpp.

In detail, the power output control circuit 7 includes at least one power transistor (not shown), and this power transistor controls the power conversion from the input to the output. Hence, if the input current Iin (or its related signal) is compared with a reference signal and the power transistor is controlled by the comparison result, a close loop can be formed to regulate the input current Iin to a target current which corresponds to the reference signal. The power output control circuit 7 can obtain the Iin related signal from the current detection circuit 9 (as shown by the dash line arrow in the figure), or detect the input current Iin by its internal circuitry. The trend judgment circuit 6 judges the directions of the slopes of the current and the power. Referring to the voltage-current curve shown in FIG. 1, when the current and the power have the same slope direction, it indicates that the present input current Iin is at the left side of the MPP, so the input current Iin can be increased to approach the optimum current Impp. In this case, according to the output from the trend judgment circuit 6, the power output control circuit 7 increases the above-mentioned reference signal, which is to increase the target current of the input current Iin. On the other hand, when the current and the power have opposite slope directions, it indicates that the present input current Iin is at the right side of the MPP, so the input current Iin can be decreased to approach the optimum current Impp. In this case, according to the output from the trend judgment circuit 6, the power output control circuit 7 decreases the above-mentioned reference signal, which is to decrease the target current of the input current Iin.

In this embodiment, the trend judgment circuit 6 includes a current trend indicator circuit 61, a power trend indicator circuit 63, and a trend comparison circuit 64. The current trend indicator circuit 61 receives the Iin related signal and judges whether the input current Iin at the present time point is more or less than the input current Iin at the previous time point, to determine the current trend (i.e., the current slope direction). The power trend indicator circuit 63 receives the Iin related signal and information related to the input voltage Vin (hereinafter "Vin related signal", which can be the input voltage Vin itself or a divided voltage thereof) and judges whether the power at the present time point is more or less than the power at the previous time point, to determine the power trend (i.e., the power slope direction). The trend comparison circuit 64 judges whether the slopes of the current and the power have the same or opposite directions according to the outputs from the current trend indicator circuit 61 and the power trend indicator circuit 63, and outputs a corresponding signal. In a preferable embodiment of the present invention, the current trend indicator circuit 61 and the power trend indicator circuit 63 have auto zero calibration function, wherein after a trend judgment (i.e., a comparison between the input current/power at the present time point and the input current/power at the previous time point) is made each time, an auto zero calibration is carried out based on the input current/power at the present time point, to store information related to the input current/power at the present time point for the next comparison. In this manner, the inaccuracy of the circuit does not affect the trend judgment. Relevant details will be described later.

Figure 4:
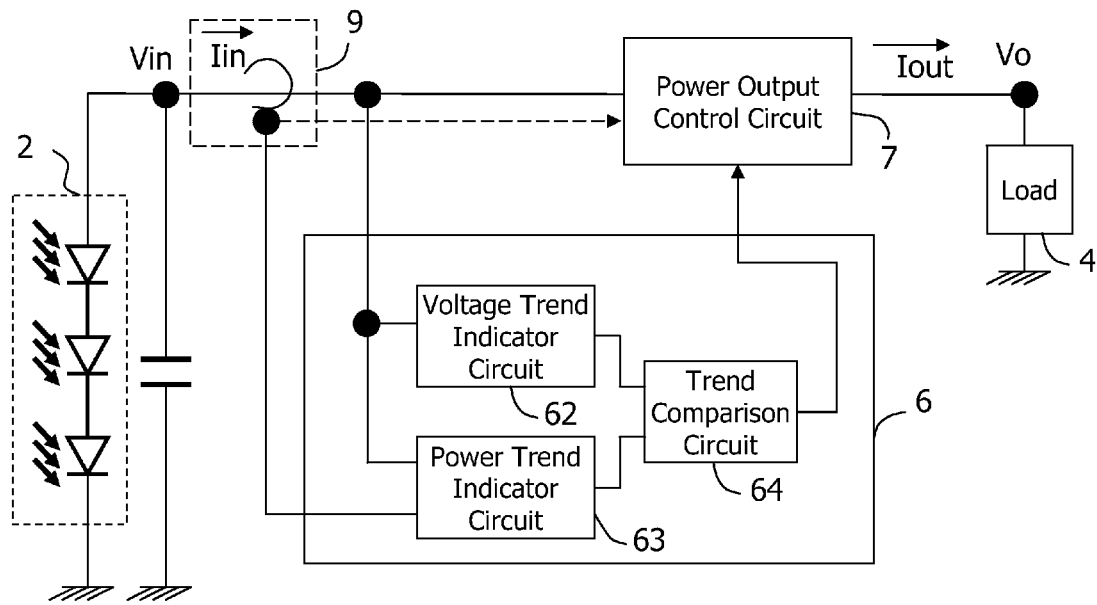

FIG. 4 shows a second embodiment of the present invention. Referring to the voltage-current curve shown in FIG. 1, at the left side of the MPP, when the voltage increases, the power decreases; the voltage and the power change along opposite directions (i.e., the slopes of the voltage and the power have opposite directions). At the right side of the MPP, when the voltage increases, the power increases; the voltage and the power change along the same direction (i.e., the slopes of the voltage and the power have the same direction). Thus, we can compare the slope (or trend) of the voltage outputted from the photovoltaic device group 2 (corresponding to the input voltage Vin) and the slope (or trend) of the power, to determine whether the present situation is located at the left side or right side of the MPP, and correspondingly adjust the power conversion from the input to the output, so that the input current Iin approaches the optimum current Impp corresponding to the maximum power point MPP.

More specifically, when the voltage and the power have opposite slope directions, it indicates that the present input current Iin is at the left side of the MPP, so the input current Iin can be increased to approach the optimum current Impp. In this case, according to the output from the trend judgment circuit 6, the power output control circuit 7 increases the target current of the input current Iin. On the other hand, when the voltage and the power have the same slope direction, it indicates that the present input current Iin is at the right side of the MPP, so the input current Iin can be decreased to approach the optimum current Impp. In this case, according to the output from the trend judgment circuit 6, the power output control circuit 7 decreases the target current of the input current Iin.

In this embodiment, the trend judgment circuit 6 includes a voltage trend indicator circuit 62, a power trend indicator circuit 63, and a trend comparison circuit 64. The voltage trend indicator circuit 62 judges whether the input voltage Vin at the present time point is more or less than the input voltage Vin at the previous time point, to determine the voltage trend (i.e., the voltage slope direction). The power trend indicator circuit 63 judges whether the power at the present time point is more or less than the power at the previous time point, to determine the power trend (i.e., the power slope direction). The trend comparison circuit 64 judges whether the slopes of the voltage and the power have the same or opposite directions according to the outputs from the current trend indicator circuit 61 and the power trend indicator circuit 63, and outputs a corresponding signal. In a preferable embodiment of the present invention, the voltage trend indicator circuit 62 and the power trend indicator circuit 63 have auto zero calibration function, wherein after a trend judgment (i.e., a comparison between the input voltage/power at the present time point and the input voltage/power at the previous time point) is made each time, an auto zero calibration is carried out based on the input voltage/power at the present time point, to store information related to the input voltage/power at the present time point for the next comparison. In this manner, the inaccuracy of the circuit does not affect the trend judgment. Relevant details will be described later.

Figure 5:
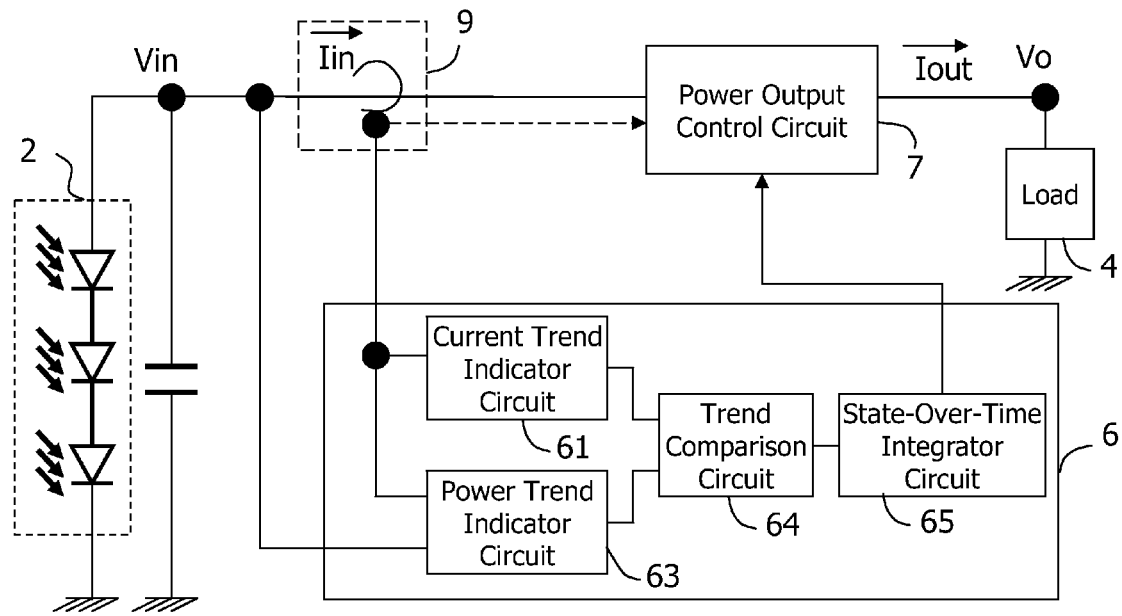
Figure 6:
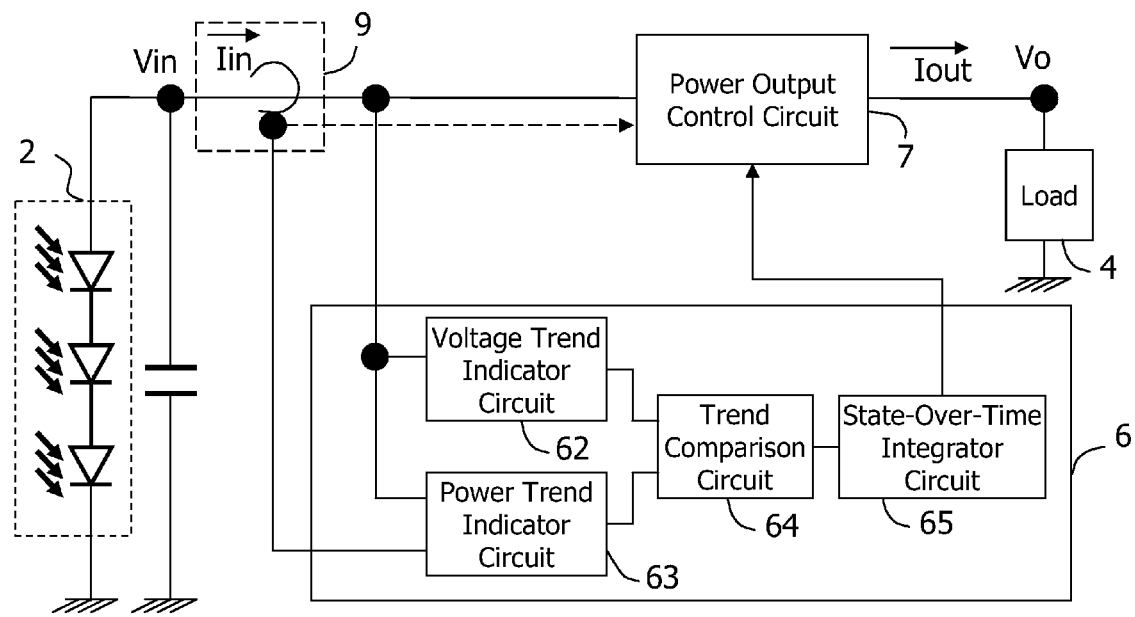

In the two embodiments described above, the output from the trend judgment circuit 6 simply indicates "whether the slopes of the current and the power have the same or opposite directions" or "whether the slopes of the voltage and the power have the same or opposite directions". In other preferable embodiments, as shown in FIGS. 5 and 6, the trend judgment circuit 6 further includes a state-over-time integrator circuit 65, which integrates the state value (i.e., the trend comparison result from the trend comparison circuit 64). The meaning of this arrangement is that: when the trend comparison result generated by the trend comparison circuit 64 maintains at the same state for a longer period of time, it indicates that the input current Iin is farther from the optimum current Impp, and thus the reference signal can be adjusted by a larger step (corresponding to adjusting the target current of the input current Iin by a larger step) so that the input current Iin approaches the optimum current Impp faster. The details of the state-over-time integrator circuit 65 will be described later.

Figure 7:
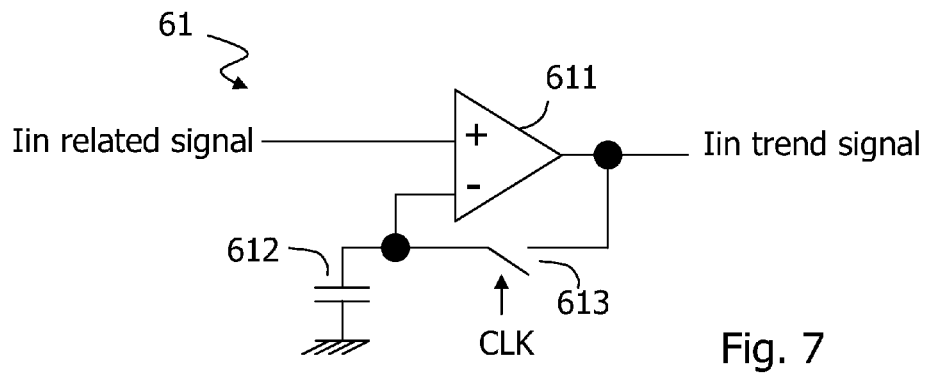
FIG. 7 shows an embodiment of a current trend indicator circuit.

FIG. 7 shows an embodiment of the current trend indicator circuit 61 having auto zero calibration function. In this embodiment, the current trend indicator circuit 61 includes a comparison and amplification circuit 611, a capacitor 612 and a switch 613. The comparison and amplification circuit 611 has one input terminal receiving the Iin related signal and another input terminal coupled to a high voltage terminal of the capacitor 612. (A capacitor has two terminals; the one that is connected to a relatively high voltage is referred to as the high voltage terminal and the other one that is connected to a relatively low voltage is referred to as the low voltage terminal.) The switch 613 is coupled between an output of the comparison and amplification circuit 611 and high voltage terminal of the capacitor 612. The switch 613 is controlled by a clock signal CLK. The clock signal CLK is or is synchronized with, for example but not limited to, the clock signal used in the power output control circuit 7 (it is well known that the power output control circuit 7 requires a clock signal and this is not redundantly explained here). At time point T1, the clock signal CLK turns ON the switch 613 to store the comparison result between the two input terminals of the comparison and amplification circuit 611 in the capacitor 612. By close loop feedback mechanism, at balanced state, the signals at the two input terminals of the comparison and amplification circuit 611 will be substantially equal to each other (however due to the mismatch or inaccuracy of the internal devices of the comparison and amplification circuit 611, there may be an offset in between). Therefore, what is stored in the capacitor 612 is the Iin related signal at time point T1 plus the offset of the comparison and amplification circuit 611. At time point T2, the clock signal CLK turns OFF the switch 613. The comparison and amplification circuit 611 compares the Iin related signal at time point T1 with the Iin related signal at time point T2, to generate an output indicating the current slope direction (Iin trend signal). Thereafter, the clock signal CLK turns ON the switch 613 again to store the Iin related signal at time point T2. In other words, the circuit operates in a "storage mode" when the switch 613 is turned ON, and operates in a "comparison mode" when the switch 613 is turned OFF.

In view of the above, although the mismatch or inaccuracy of the internal devices in the comparison and amplification circuit 611 may cause an offset between the two input terminals of the comparison and amplification circuit 611 when the close loop is at a balanced state, such offset is included in the information stored in the capacitor 612 (i.e., "auto zero calibration"), so the current trend indicator circuit 61 can correctly judge the current trend regardless of the inaccuracy of the comparison and amplification circuit 611 due to its offset.

Figure 8:
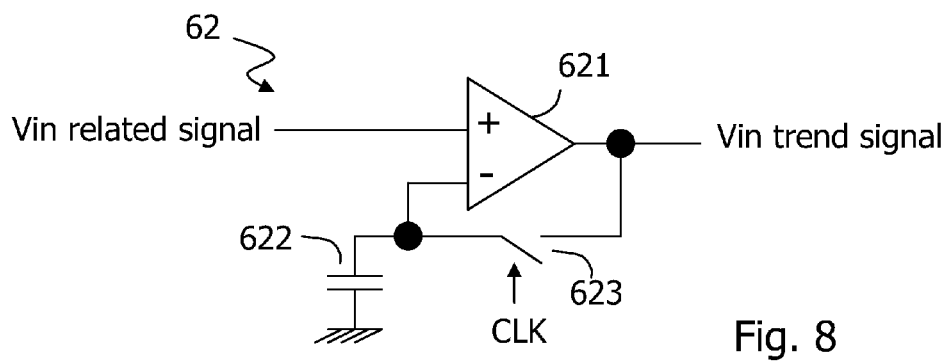
FIG. 8 shows an embodiment of a voltage trend indicator circuit.

FIG. 8 shows an embodiment of the voltage trend indicator circuit 62 having auto zero calibration function. In this embodiment, the voltage trend indicator circuit 62 includes a comparison and amplification circuit 621, a capacitor 622 and a switch 623. The voltage trend indicator circuit 62 operates in a similar fashion as the current trend indicator circuit 61 to provide the auto zero calibration function, and it is not redundantly explained here.

Figure 9:
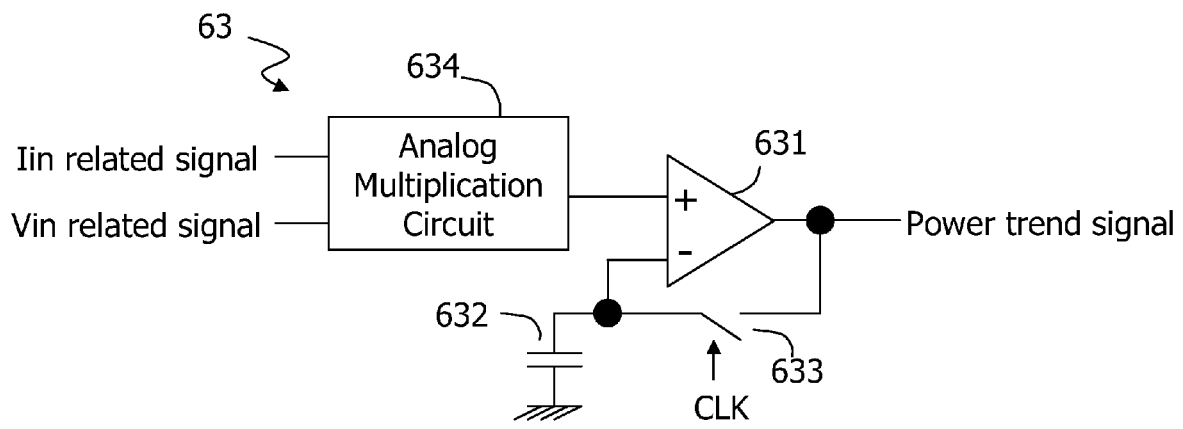
FIG. 9 shows an embodiment of a power trend indicator circuit.

FIG. 9 shows an embodiment of the power trend indicator circuit 63 having auto zero calibration function. In this embodiment, the power trend indicator circuit 62 includes a comparison and amplification circuit 631, a capacitor 632, a switch 633 and an analog multiplication circuit 634. The analog multiplication circuit 634 multiples the Iin related signal with the Vin related signal to obtain a power related signal. The comparison and amplification circuit 631, the capacitor 632 and the switch 633 operate in a similar fashion as the current trend indicator circuit 61 to provide the auto zero calibration function, and their operations are not redundantly explained here.

When the current trend indicator circuit 61, the voltage trend indicator circuit 62 and/or the power trend indicator circuit 63 operates in the storage mode, it can be regarded as that the trend judgment circuit 6 operates in the storage mode. When the current trend indicator circuit 61, the voltage trend indicator circuit 62 and/or the power trend indicator circuit 63 operates in the comparison mode, it can be regarded as that the trend judgment circuit 6 operates in the comparison mode.

Figure 10:
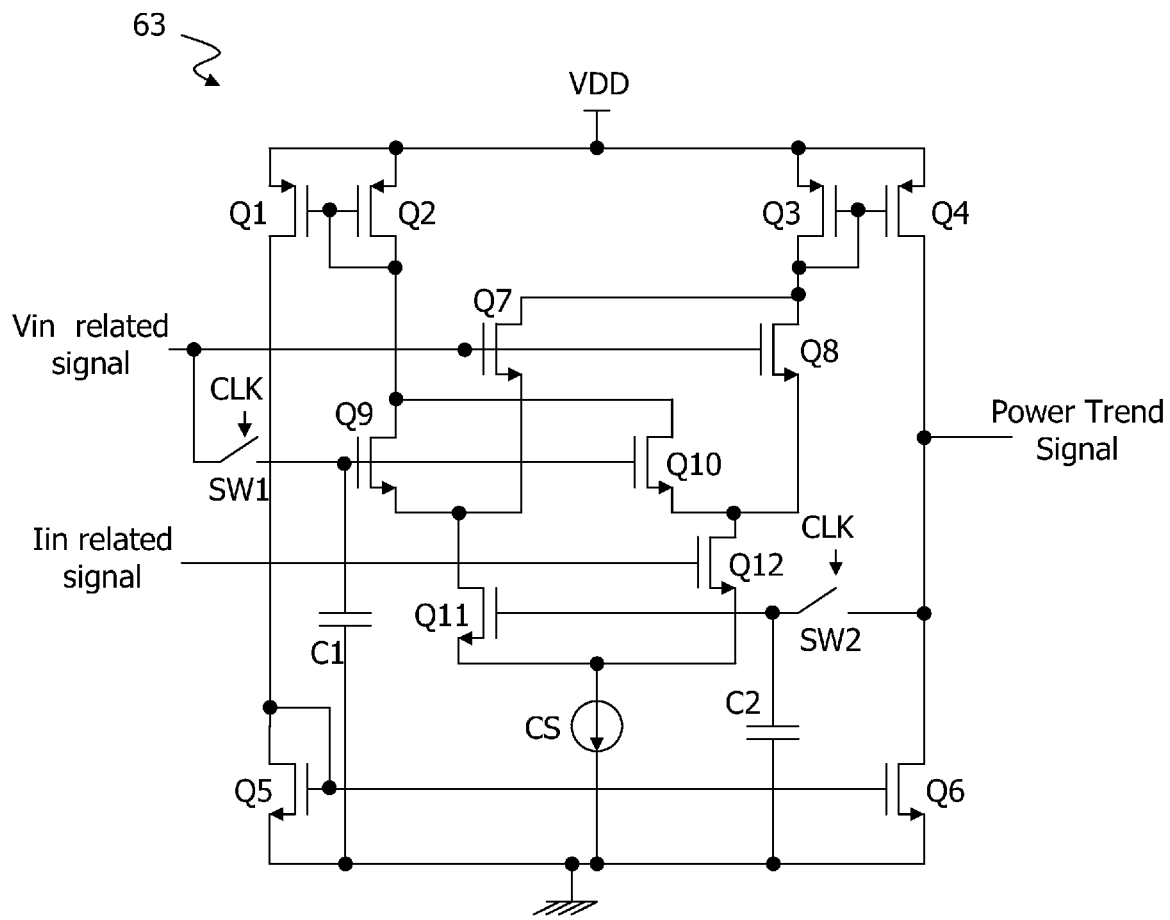
FIGS. 10 and 11 show two more specific embodiments of the power trend indicator circuits.

FIG. 9 is an illustrative drawing to explain the operation of the power trend indicator circuit 63 by a high level circuit structure which is easier for a reader to understand the concept. In practical implementation, the power trend indicator circuit 63 can be embodied in a simpler form by an analog circuit which combines the analog multiplication circuit 634 and the comparison and amplification circuit 631 (i.e., they share common devices). Such combination is referred to as "multiplication and comparison and amplification circuit" hereinafter. FIG. 10 shows an embodiment of a power trend indicator circuit 63 including such multiplication and comparison and amplification circuit. However, it should be noted that the simplified analog circuit is only an illustrative embodiment but not a limitation to the present invention; the present invention can be implemented by other ways.

In the embodiment shown in FIG. 10, VDD is a positive voltage supply. The transistors Q1 and Q2, the transistors Q3 and Q4, and the transistors Q5 and Q6 form respective current mirrors. (The current mirrors are for duplicating currents and the number of the current mirrors is not limited to what is shown in this embodiment. The number of the current mirrors can be modified as required.) The switches SW1 and SW2 are controlled by the clock signal CLK, to respectively store the Vin related signal and the Iin related signal at the previous time point in the capacitors C1 and C2. The current source CS and the transistors Q11 and Q12 form a comparison and amplification circuit; one terminal of the transistor Q11 and one terminal of the transistor Q12 are coupled to the current source CS, and the transistors Q11 and Q12 compete for the distribution of the current of the current source CS. The gates of the transistors Q11 and Q12 receive the Iin related signal and the voltage across the capacitor C2, respectively; in other words, the comparison and amplification circuit compares the Iin related signal and the voltage across the capacitor C2, which is to compare the Iin related signal at the present time point with the Iin related signal at the previous time point. The gates of the transistors Q7 and Q8 receive the Vin related signal at the present time point, and the gates of the transistors Q9 and Q10 receive the voltage across the capacitor C1, i.e., the Vin related signal at the previous time point. One terminal of the transistor Q7 and one terminal of the transistor Q9 are connected to another terminal of the transistor Q11, and the transistors Q7 and Q9 compete for the distribution of the current through the transistor Q11. One terminal of the transistor Q8 and one terminal of the transistor Q10 are connected to another terminal of the transistor Q12, and the transistors Q8 and Q10 compete for the distribution of the current through the transistor Q12. In other words, the transistors Q7-10 also form a comparison and amplification circuit which compares the Vin related signal at the present time point with the Vin related signal at the previous time point (the gate voltages of the transistors Q7 and Q9 compare with each other and the gate voltages of the transistors Q8 and Q10 compare with each other). Additionally, because the transistors Q7-12 accumulate the voltage comparison results and the current comparison result, the transistors Q7-12 also form an analog multiplication circuit. As a whole, the above circuit achieves both the multiplication function and the comparison function, which is the "multiplication and comparison and amplification circuit". The final output is a power trend signal, which is a comparison result between the current of the transistor Q4 and the current of the transistor Q6. The comparison result carries voltage and current information, so it indicates the power trend. Note that the transistors Q7-Q12 may have mismatches to cause offsets, but a total effect of the offsets (referred to as "equivalent total offset") is still cancelled by the auto zero calibration function.

More specifically, let us assume that the Vin related signal at the previous time point is Vt1; the Vin related signal at the present time point is Vt2; the Iin related signal at the previous time point is It1; and the Iin related signal at the present time point is It2. The current which flows through the transistor Q7 and also flows through the transistor Q11 is related to Vt2·It1; the current which flows through the transistor Q9 and also flows through the transistor Q11 is related to Vt1·It1; and the total current flowing through the transistor Q11 is a sum of the above two currents. The current which flows through the transistor Q8 and also flows through the transistor Q12 is related to Vt2·It2; the current which flows through the transistor Q10 and also flows through the transistor Q12 is related to Vt1·It2; and the total current flowing through the transistor Q12 is a sum of the above two currents. The current which flows through the transistor Q3 is a sum of the current which flows through the transistor Q7 and the current which flows through the transistor Q8, i.e., (Vt2·It1)+(Vt2·It2). The current which flows through the transistor Q2 is a sum of the current which flows through the transistor Q9 and the current which flows through the transistor Q10, i.e., (Vt1·It1)+(Vt1·It2). The current which flows through the transistor Q4 is equal to the current which flows through the transistor Q3, and the current which flows through the transistor Q6 is equal to the current which flows through the transistor Q2. Therefore, the final output is a comparison between [(Vt2·It1)+(Vt2·It2)] and [(Vt1·It1)+(Vt1·It2)], in which the items (Vt2·It1) and (Vt1·It2) will cancel each other at least partially, so the comparison between (Vt2·It2) and (Vt1·It1) will dominate the final result; that is, the final output which is the power trend signal is determined by the comparison between the power at the present time point (Vt2·It2) and the power at the previous time point (Vt1·It1).

Figure 11:
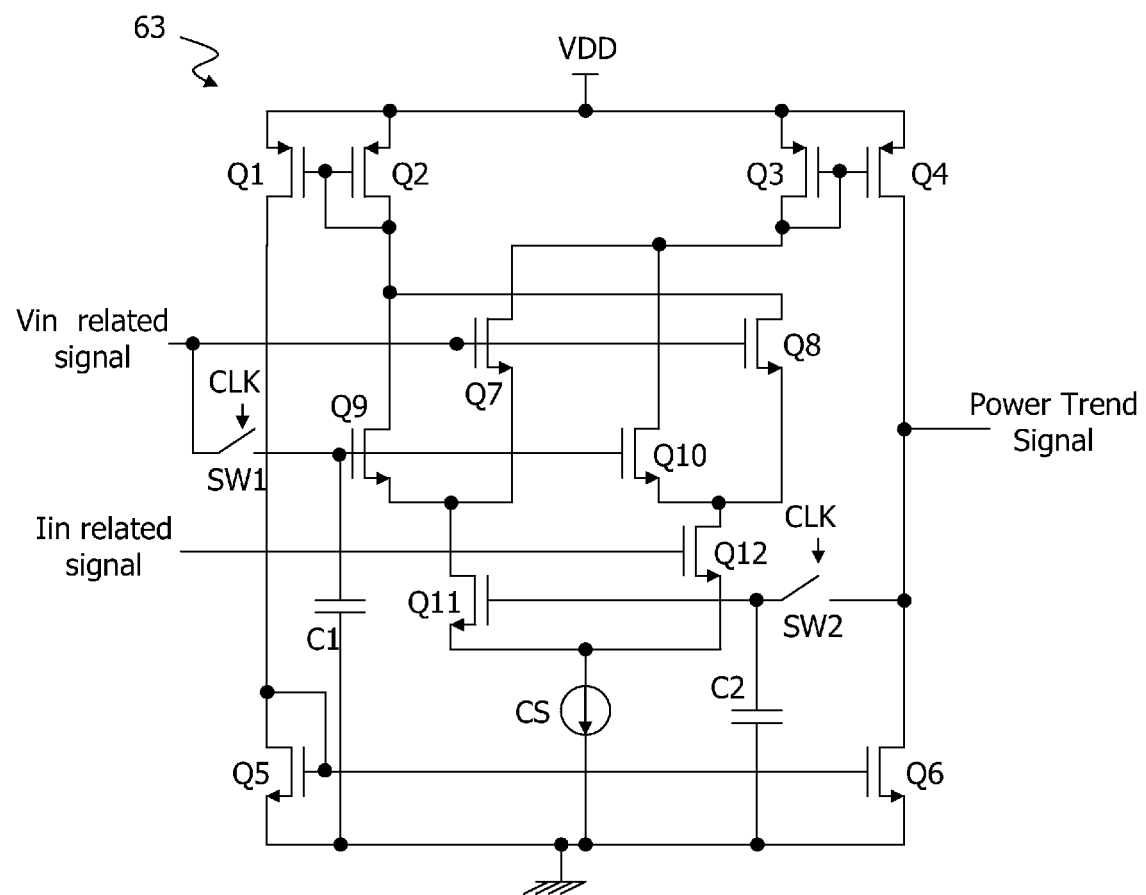

In view of the above, apparently, the items (Vt2·It1) and (Vt1·It2) which cancel each other at least partially are of less importance and their positions in the equation can be interchanged. That is, the comparison between [(Vt1·It2)+(Vt2·It2)] and [(Vt1·It1)+(Vt2·It1)] still presents the power trend. This means that the sum of the currents through the transistors Q7 and Q10 are compared with the sum of the currents through the transistors Q8 and Q9; a corresponding circuit is shown by the embodiment of FIG. 11, which is different from the embodiment of FIG. 10 only in the connections of the transistors Q7-Q10.

Figure 12:
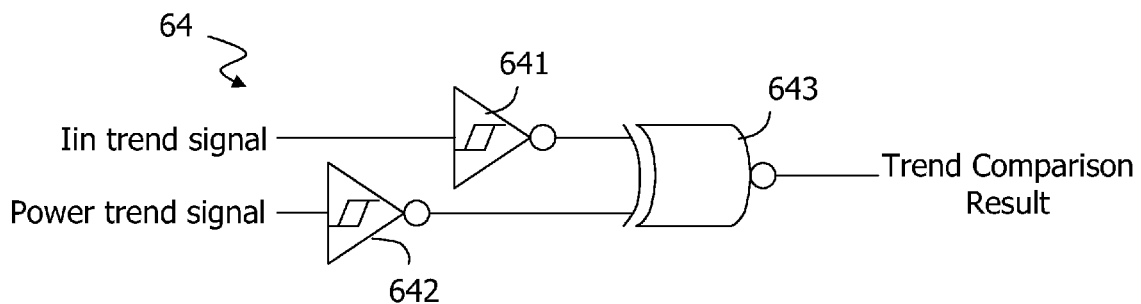
FIGS. 12 and 13 show two embodiments of trend comparison circuits.
Figure 13:
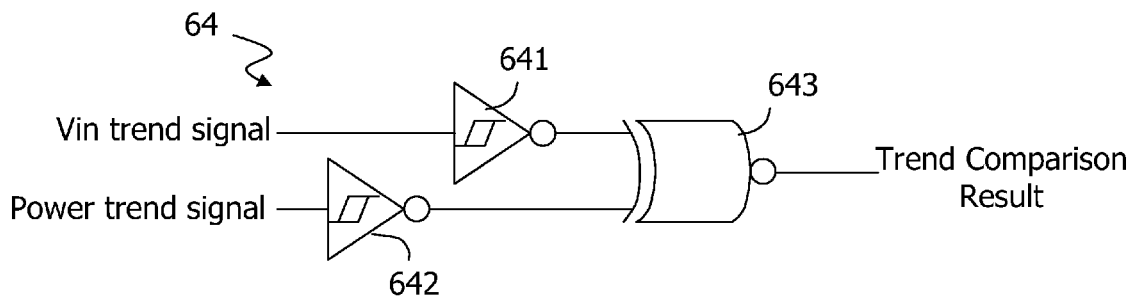

In one embodiment, the trend comparison circuit 64 can be a simple logic gate. Depending on the format required by a subsequent circuit to process the output from the trend comparison circuit 64, the logic gate can be an OR, AND, NOR, NAND, exclusive OR or exclusive AND gate. In brief, in one embodiment, the output of the trend comparison circuit 64 can be as simple as a one-digit signal indicating whether the slopes of the current and the power have the same or opposite directions (embodiments of FIGS. 5 and 7) or whether the slopes of the current and the power have the same or opposite directions (embodiments of FIGS. 6 and 8); certainly, the output of the trend comparison circuit 64 can be a signal of a more complicated form. In a preferable embodiment, the trend comparison circuit 64 includes hysteresis input circuits. Referring to FIG. 12 which shows a trend comparison circuit 64 that can be applied to the embodiments of FIGS. 5 and 7, the trend comparison circuit 64 includes hysteresis circuits 641 and 642 which receive the Iin trend signal and the power trend signal respectively, and the logic gate 643 operates on the outputs from the hysteresis circuits 641 and 642 to generate trend comparison result. The logic gate 643 is shown to be an exclusive AND gate for example. It can be any other logic gate as explained in the above. The trend comparison circuit 64 in FIG. 13 can be applied to the embodiments of FIGS. 6 and 8; the circuit operates in the same way and therefore is not redundantly explained.

Figure 14:
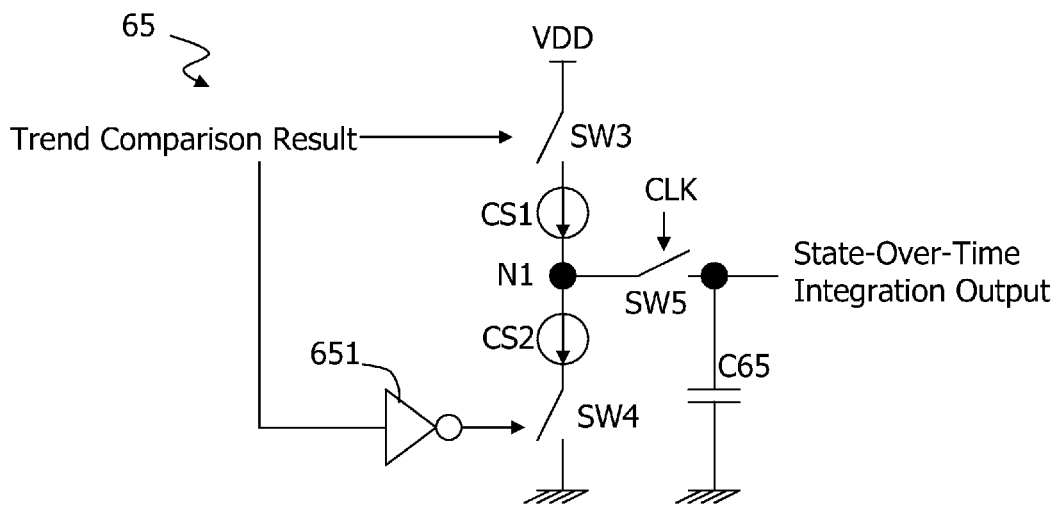
FIGS. 14-20 show seven embodiments of state-over-time integrator circuits.

FIG. 14 shows a first embodiment of the state-over-time integrator circuit 65 according to the present invention. In this embodiment, VDD is a positive voltage supply. The state-over-time integrator circuit 65 includes current sources CS1 and CS2, switches SW3 and SW4, and a capacitor C65. The inverter 651 can be a device inside the state-over-time integrator circuit 65 or an external device. The state-over-time integrator circuit 65 may optionally include another switch SW5. The current source CS1 is coupled between the voltage supply VDD and a common node N1 for supplying charges. The current source CS2 is coupled between the common node N1 and ground for discharging charges. The switches SW3 and SW4 are controlled by the trend comparison result and its inverted signal respectively, to determine whether the capacitor C65 should be charged by the current source CS1 or should be discharged by the current source CS2. If the switch SW5 is provided, it can be coupled between the common node N1 and a high voltage terminal of the capacitor C65, and controlled by the clock signal CLK, so that the common node N1 and the high voltage terminal of the capacitor C65 are in conduction only at proper timings. The switch SW5 can be omitted if such timing control is not critical. The high voltage terminal of the capacitor C65 can serve as the output terminal to generate a state-over-time integration output in voltage form. When the trend comparison result outputted from the trend comparison circuit 64 maintains at the same state for a period of time, the state-over-time integration output indicates such condition so that the power output control circuit 7 adjusts the target current of the input current Iin correspondingly (referring to the embodiments of FIGS. 5 and 6).

Figure 15:
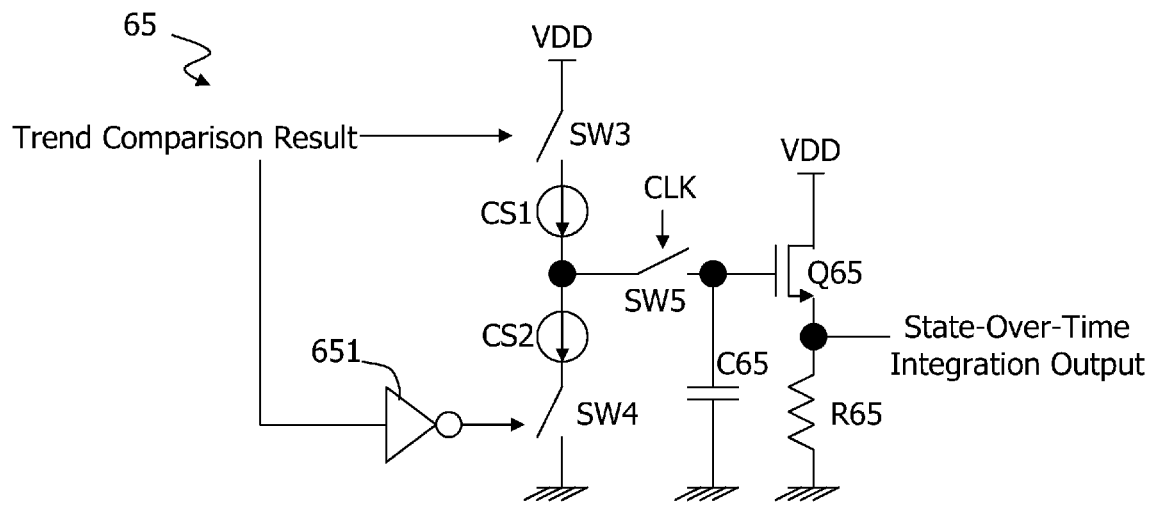

FIG. 15 shows a second embodiment of the state-over-time integrator circuit 65 according to the present invention. In this embodiment, the state-over-time integrator circuit 65 further includes a MOS transistor Q65 and a resistor R65 in addition to the devices shown in FIG. 14. The MOS transistor Q65 has a gate which is controlled by the high voltage terminal of the capacitor C65, a current inflow terminal which is coupled to the voltage supply VDD, and a current outflow terminal which is coupled to the resistor R65. The MOS transistor Q65 and the resistor R65 form a source follower. The high voltage terminal of the resistor R65 can serve as the output terminal to generate a state-over-time integration output in voltage form. (A resistor has two terminals; the one that is connected to a relatively high voltage is referred to as the high voltage terminal and the other one that is connected to a relatively low voltage is referred to as the low voltage terminal.) The merit of this embodiment is that the power output control circuit 7 is isolated from the capacitor C65 so that the operation of the power output control circuit 7 does not affect the charges stored in the capacitor C65.

Figure 16:
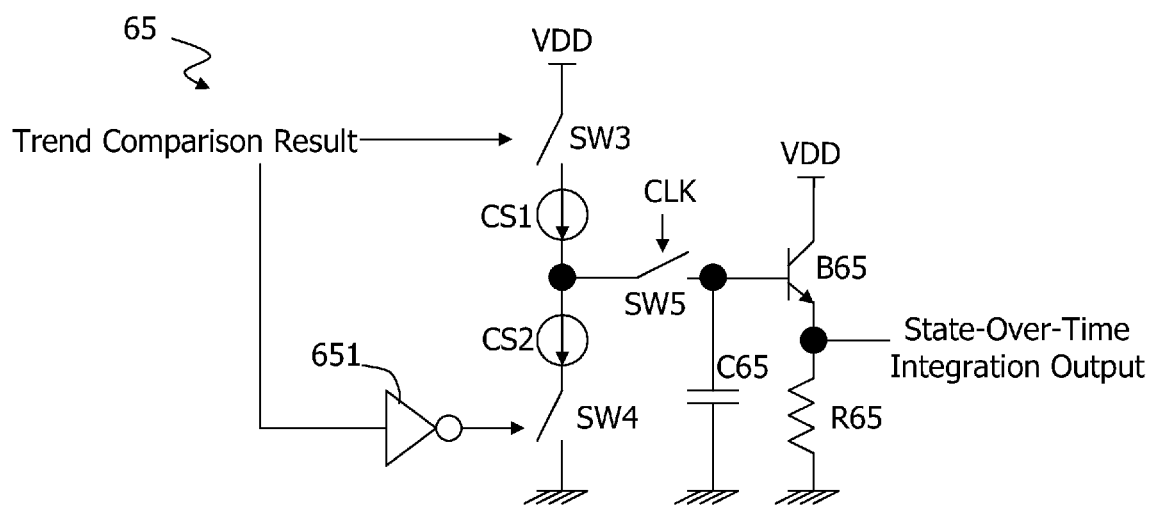

FIG. 16 shows a third embodiment of the state-over-time integrator circuit 65 according to the present invention. This embodiment is similar to the embodiment of FIG. 15 except that the MOS transistor Q65 is replaced by a BJT transistor B65. The BJT transistor B65 has a base which is controlled by the high voltage terminal of the capacitor C65, a collector which is coupled to the voltage supply VDD, and an emitter which is coupled to the resistor R65. The BJT transistor B65 and the resistor R65 form an emitter follower. The high voltage terminal of the resistor R65 can serve as the output terminal to generate a state-over-time integration output in voltage form.

Figure 17:
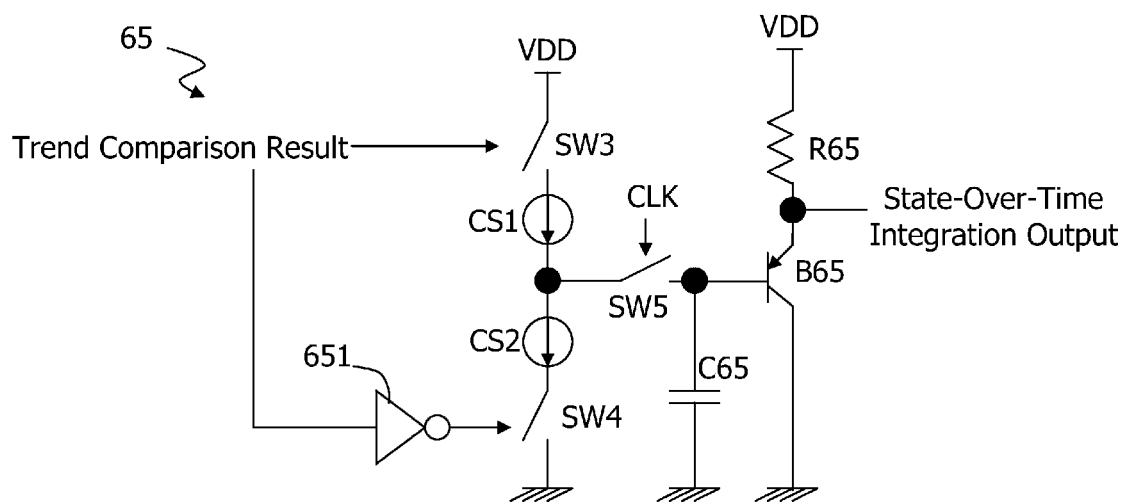

FIG. 17 shows a fourth embodiment of the state-over-time integrator circuit 65 according to the present invention. This embodiment is similar to the embodiment of FIG. 16 except that the locations of the BJT transistor B65 and the resistor R65 are interchanges. The circuit operates in a similar way and provides an equivalent effect as the embodiment of FIG. 16.

Figure 18:
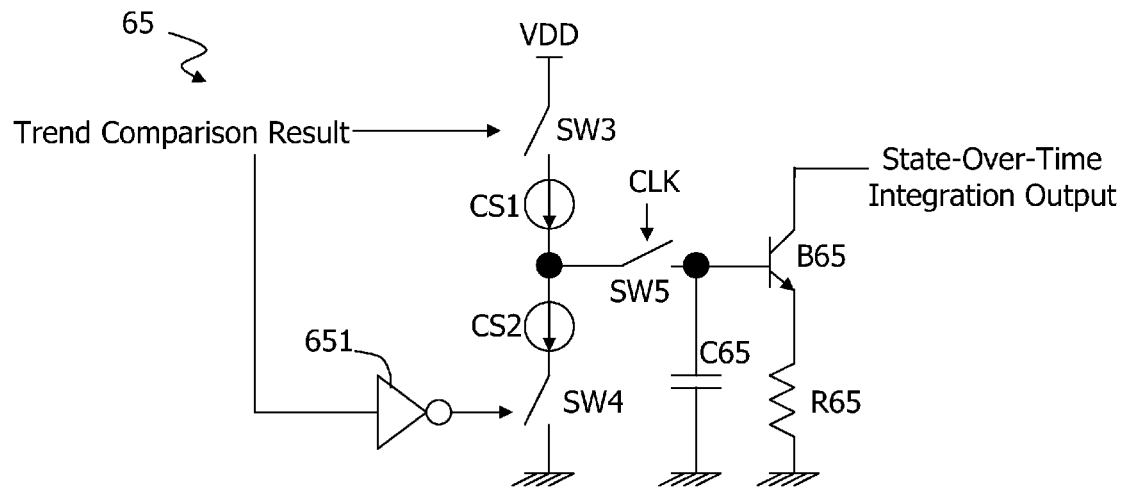

FIG. 18 shows a fifth embodiment of the state-over-time integrator circuit 65 according to the present invention. This embodiment is similar to the embodiment of FIG. 16 except that the output is generated by the emitter of the BJT transistor B65, to generate a state-over-time integration output in current form. The BJT transistor B65 in this embodiment can be regarded as a voltage-controlled current source.

Figure 19:
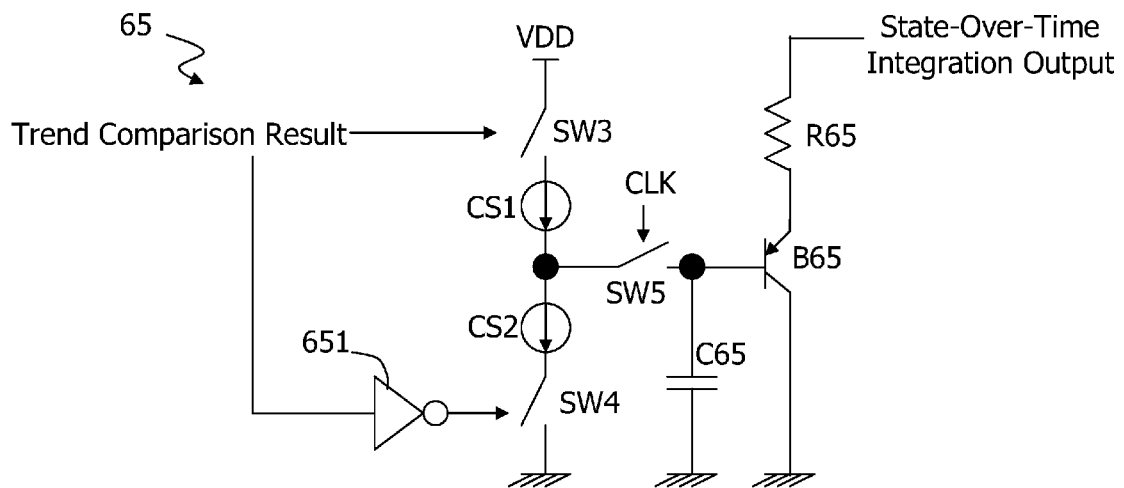

FIG. 19 shows a sixth embodiment of the state-over-time integrator circuit 65 according to the present invention. This embodiment is similar to the embodiment of FIG. 17 except that the output is generated by the emitter of the BJT transistor B65 through the resistor R65, to generate a state-over-time integration output in current form. The BJT transistor B65 in this embodiment can be regarded as a voltage-controlled current source.

Figure 20:
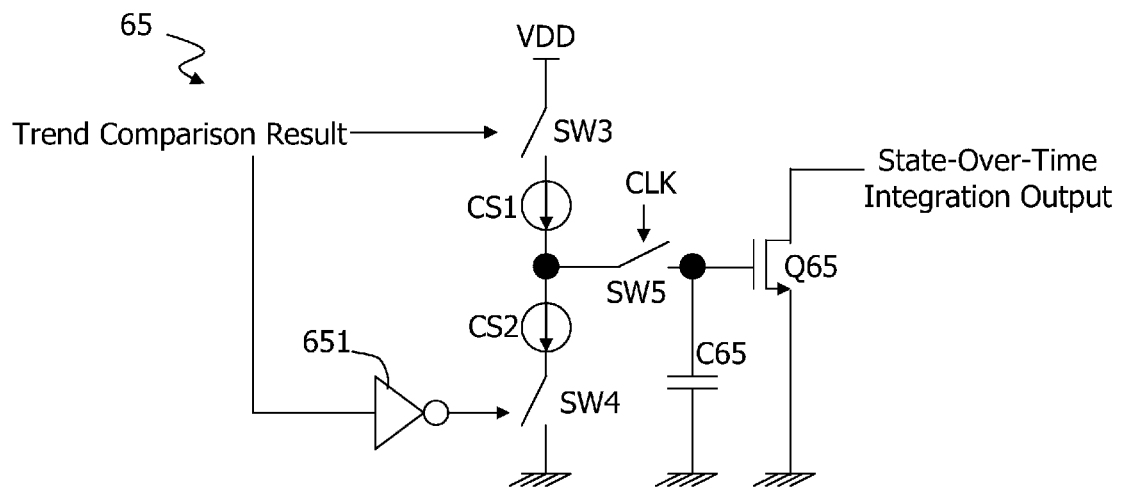

FIG. 20 shows a seventh embodiment of the state-over-time integrator circuit 65 according to the present invention. This embodiment is similar to the embodiment of FIG. 15 except that the resistor R65 is omitted, and the current inflow terminal of the transistor Q65 serves as the output terminal to generate a state-over-time integration output in current form. The MOS transistor Q65 in this embodiment can be regarded as a voltage-controlled current source, or a voltage controlled variable resistor.

It should be noted that the state-over-time integrator circuit 65 can be embodied in other forms not limited to the above embodiments. One skilled in this art can conceive other variations based on the teaching of the present invention.

Figure 21:
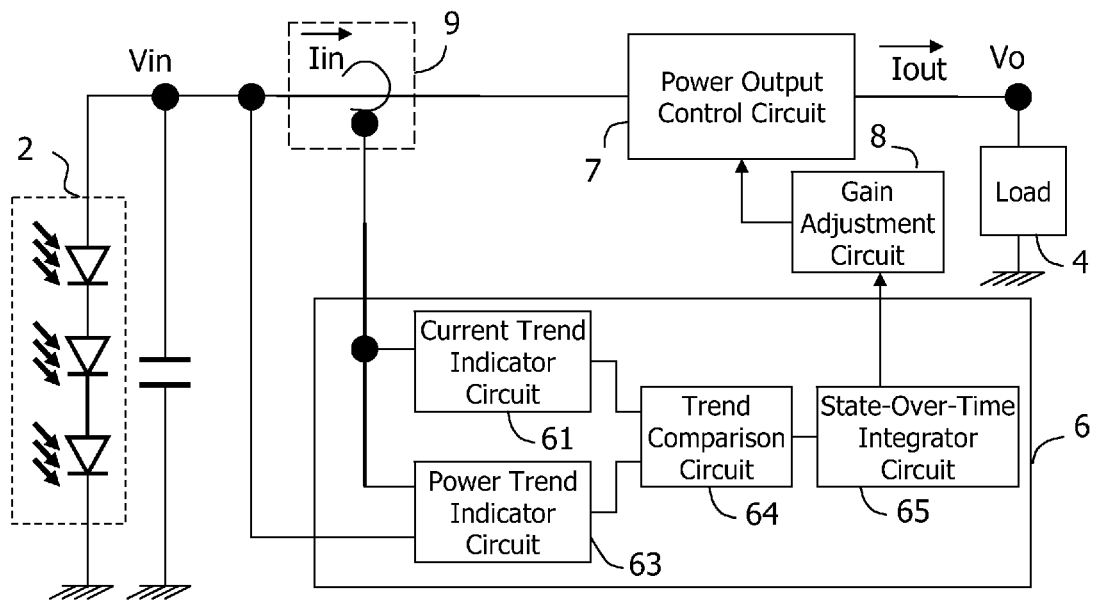
FIGS. 21 and 22 show two embodiments of the present invention.
Figure 22:
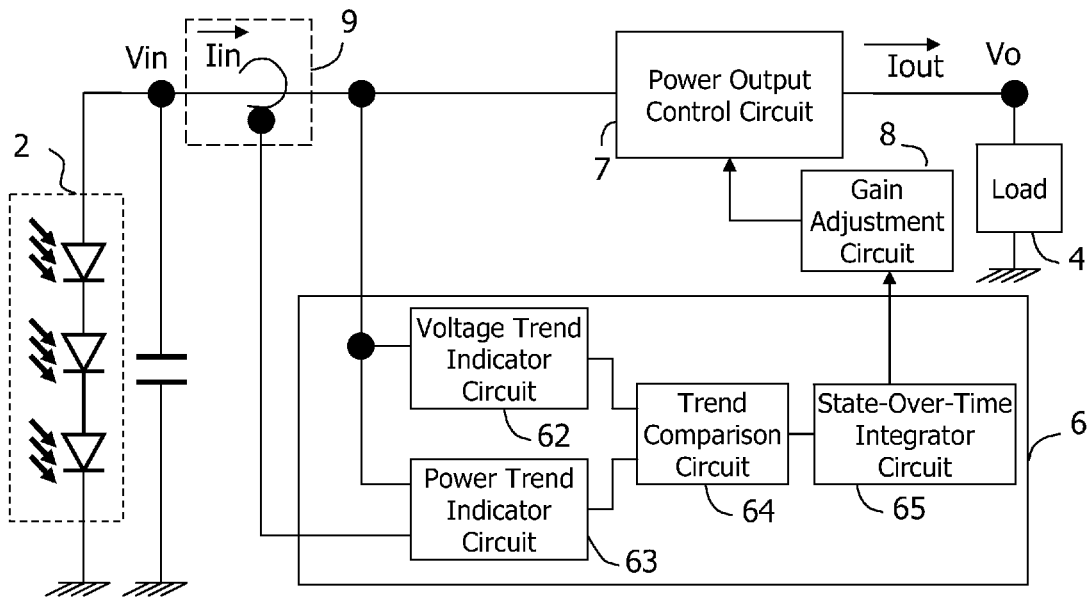

FIGS. 21 and 22 show that the present invention can further include a gain adjustment circuit 8 coupled between the state-over-time integrator circuit 65 and the power output control circuit 7. A user can adjust a gain by the gain adjustment circuit 8, i.e., to adjust weighting of the output from the state-over-time integrator circuit 65 as a control factor to the power output control circuit 7. The gain adjustment circuit 8 can be designed according to the different forms of the state-over-time integrator circuit 65. When the state-over-time integration output is a voltage signal, the gain adjustment circuit 8 for example can be a voltage scaling circuit which multiplies the state-over-time integration output by a gain α (wherein ° cis a positive number greater or smaller than 1), or a voltage-to-current converter with an adjustable ratio which multiplies the state-over-time integration output by a gain β (wherein β is a positive number greater or smaller than 1) and converts it to a current signal. When the state-over-time integration output is a current signal, the gain adjustment circuit 8 for example can be a current scaling circuit which multiplies the state-over-time integration output by a gain α' (wherein α' is a positive number greater or smaller than 1), or a current-to-voltage converter with an adjustable ratio which multiplies the state-over-time integration output by a gain β' (wherein β' is a positive number greater or smaller than 1) and converts it to a voltage signal.

Figure 23:
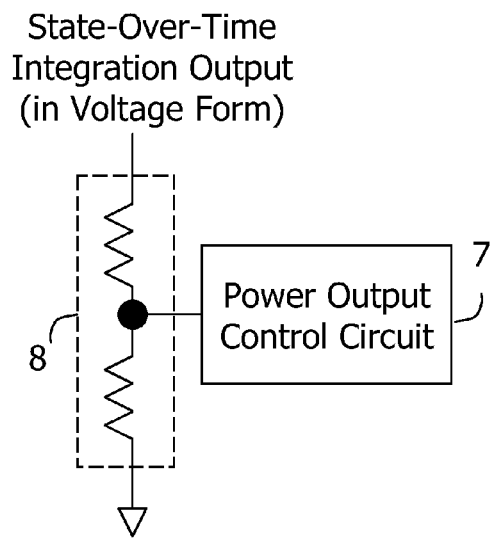
FIGS. 23-29 show seven embodiments of gain adjustment circuits.
Figure 24:
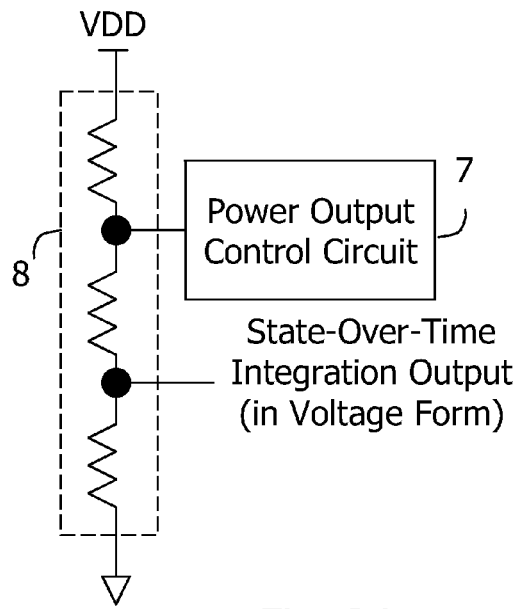
Figure 25:
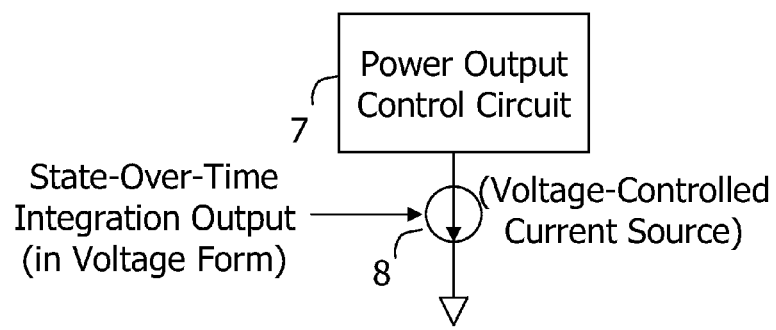

FIGS. 23-25 show several embodiments of the gain adjustment circuit 8 when the state-over-time integration output is a voltage signal. In FIG. 23, the power output control circuit 7 receives a voltage signal and the gain α is smaller than 1; in FIG. 24, the power output control circuit 7 receives a voltage signal and the gain α is greater than 1; in FIG. 25, the power output control circuit 7 receives a current signal and the gain β is greater or smaller than 1.

Figure 26:
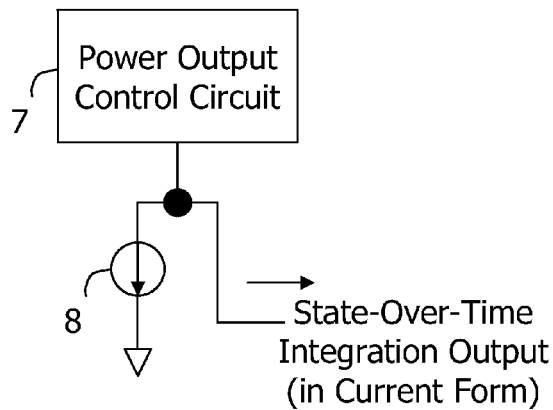
Figure 27:
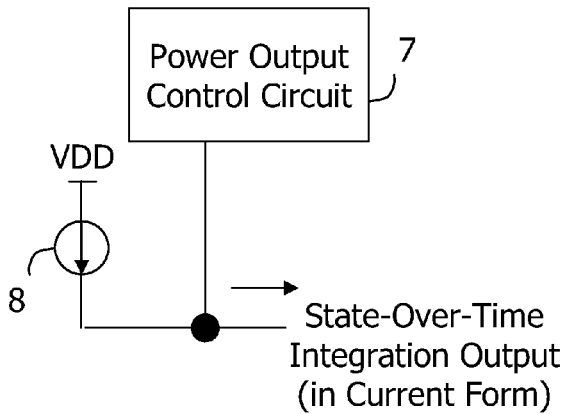
Figure 28:
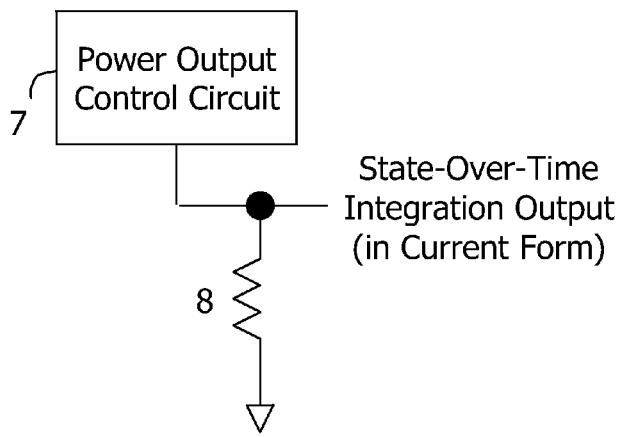
Figure 29:
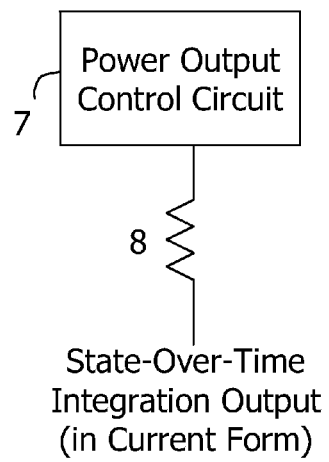

FIGS. 26-29 show several embodiments of the gain adjustment circuit 8 when the state-over-time integration output is a current signal. In FIG. 26, the power output control circuit 7 receives a current signal and the gain α' is larger than 1; in FIG. 27, the power output control circuit 7 receives a current signal and the gain α' is smaller than 1; in FIGS. 28 and 29, the power output control circuit 7 receives a voltage signal and the gain β' is greater or smaller than 1.

It should be noted that the gain adjustment circuit 8 can be embodied in other forms not limited to the above embodiments. One skilled in this art can conceive other variations based on the teaching of the present invention.

The present invention has the following advantages: first, the present invention only needs to judge the trends of the current and the power, or the trends of the voltage and the power; because the present invention does not need to perform complicated calculation, the circuit is much simpler than the prior art. Second, the current trend indicator circuit 61, the voltage trend indicator circuit 62 and the power trend indicator circuit 63 have auto zero calibration function, so the accuracy requirement of the internal devices of a comparison and amplification circuit is less stringent. Third, the power trend indicator circuit 63 can be implemented by a simple analog circuit. Fourth, the state-over-time integrator circuit 65 can speed up the response of the power output control circuit 7 so that the input current Iin is regulated to the target current (i.e., the optimum current point Impp) by a shorter time. Fifth, the gain adjustment circuit 8 can adjust the weighting of the output from the state-over-time integrator circuit 65 as a control factor to the power output control circuit 7.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, "controlling the input current Iin to track the optimum current point Impp corresponding to the maximum power point MPP" includes but does not limit that the input current Iin must be controlled directly; as an example, the input current Iin can be controlled indirectly to approach the optimum current point Impp by adjusting the input voltage Vin to be close to the optimum voltage point Vmpp. Likely, "controlling the input voltage Vin to track the optimum voltage point Vmpp corresponding to the maximum power point MPP" also includes direct and indirect control. For another example, a device or circuit which does not substantially influence the primary function of a signal can be inserted between any two devices or circuits in the shown embodiments, such as a switch or the like, so the term "couple" should include direct and indirect connections; as an example, the number of the current mirrors can be modified. For another example, the positive and negative input terminals of the comparison and amplification circuits are interchangeable, with corresponding amendments of the circuits processing these signals. For another example, in the embodiments shown in FIGS. 14-20, the trend comparison result and its inverted signal can be interchanged, with corresponding amendments of the operations of the switches SW3 and SW4, and the switches SW3 and SW4 can be located between the current source CS1 and the common node N1 and between the current source CS2 and the common node N1, respectively. In view of the foregoing, the spirit of the present invention should cover all such and other modifications and variations, which should be interpreted to fall within the scope of the following claims and their equivalents. Furthermore, an embodiment or a claim of the present invention does not have to achieve all the advantages of the present invention. The abstract is provided for assisting searches but not for limiting the scope of the present invention.

What is claimed is:

1. A photovoltaic power circuit with auto zero calibration, for converting an input current and an input voltage generated by a photovoltaic device to an output current and an output voltage, the photovoltaic power circuit comprising:

a trend judgment circuit having a storage mode and a comparison mode, the trend judgment circuit including:
   a current trend indicator circuit configured to operably judge a slope direction of the input current at a present time point as compared with the input current at a previous time point in the comparison mode to generate a current trend signal, or a voltage trend indicator circuit configured to operably judge a slope direction of the input voltage at the present time point as compared with the input voltage at the previous time point in the comparison mode to generate a voltage trend signal;
   a power trend indicator circuit configured to operably judge a slope direction of the power at the present time point as compared with the power at the previous time point according to the input current and the input voltage in the comparison mode to generate a power trend signal; and
   a trend comparison circuit configured to operably generate a trend comparison result according to the current trend signal and the power trend signal, or according to the voltage trend signal and the power trend signal; and a power output control circuit which is coupled to the photovoltaic device at an input terminal and extracts electric energy at the input terminal to generate the output current and the output voltage at an output terminal, the power output control circuit adjusts the power conversion from the input terminal to the output terminal directly or indirectly according to an output from the trend judgment circuit so that the input current approaches an optimum current of the photovoltaic device, wherein the power trend indicator circuit includes:
   an analog multiplication circuit configured to operably receive a signal related to the input current and a signal related to the input voltage, and multiply them to obtain a signal related to power;

a comparison and amplification circuit having an input terminal configured to operably receive the signal related to power;
a capacitor having a high voltage terminal coupled to another input terminal of the comparison and amplification circuit; and
a switch coupled between an output terminal of the comparison and amplification circuit and the high voltage terminal of the capacitor, the switch being controlled by a clock signal.

2. A photovoltaic power circuit with auto zero calibration, for converting an input current and an input voltage generated by a photovoltaic device to an output current and an output voltage, the photovoltaic power circuit comprising:
a trend judgment circuit having a storage mode and a comparison mode, the trend judgment circuit including:
a current trend indicator circuit configured to operably judge a slope direction of the input current at a present time point as compared with the input current at a previous time point in the comparison mode to generate a current trend signal, or a voltage trend indicator circuit configured to operably judge a slope direction of the input voltage at the present time point as compared with the input voltage at the previous time point in the comparison mode to generate a voltage trend signal;
a power trend indicator circuit configured to operably judge a slope direction of the power at the present time point as compared with the power at the previous time point according to the input current and the input voltage in the comparison mode to generate a power trend signal; and
a trend comparison circuit configured to operably generate a trend comparison result according to the current trend signal and the power trend signal, or according to the voltage trend signal and the power trend signal; and
a power output control circuit which is coupled to the photovoltaic device at an input terminal and extracts electric energy at the input terminal to generate the output current and the output voltage at an output terminal, the power output control circuit adjusts the power conversion from the input terminal to the output terminal directly or indirectly according to an output from the trend judgment circuit so that the input current approaches an optimum current of the photovoltaic device,
wherein the power trend indicator circuit includes:
a first and a second switches controlled by a clock signal;
a first capacitor coupled to a signal related to the input voltage through the first switch, configured to operably store the signal related to the input voltage when the first switch is conductive;
a second capacitor coupled to a signal related to the input current through the second switch, configured to operably store the signal related to the input current when the second switch is conductive;
a current source;
a first transistor controlled by the signal related to the input current at the previous time point and having one terminal coupled to the current source;
a second transistor controlled by the signal related to the input current at the present time point and having one terminal coupled to the current source, wherein the first and second transistors compete for distribution of a current of the current source;

a third and a fourth transistors controlled by the signal related to the input voltage at the present time point;
a fifth and a sixth transistors controlled by the signal related to the input voltage at the present time point, wherein each of the third and the fifth transistors has one terminal coupled to another terminal of the first transistor, and the third and the fifth transistors compete for distribution of a current flowing through the first transistor, and wherein each of the fourth and the sixth transistors has one terminal coupled to another terminal of the second transistor, and the fourth and the sixth transistors compete for distribution of a current flowing through the second transistor;
a first current mirror circuit obtaining a first sum of currents flowing through the third and the fourth transistors and duplicating the first sum to generate a first signal; and
a second current mirror circuit obtaining a second sum of currents flowing through the fifth and the sixth transistors and duplicating the second sum to generate a second signal;
wherein a comparison between the first signal and the second signal shows a power trend.

3. A photovoltaic power circuit with auto zero calibration, for converting an input current and an input voltage generated by a photovoltaic device to an output current and an output voltage, the photovoltaic power circuit comprising:
a trend judgment circuit having a storage mode and a comparison mode, the trend judgment circuit including:
a current trend indicator circuit configured to operably judge a slope direction of the input current at a present time point as compared with the input current at a previous time point in the comparison mode to generate a current trend signal, or a voltage trend indicator circuit configured to operably judge a slope direction of the input voltage at the present time point as compared with the input voltage at the previous time point in the comparison mode to generate a voltage trend signal;
a power trend indicator circuit configured to operably judge a slope direction of the power at the present time point as compared with the power at the previous time point according to the input current and the input voltage in the comparison mode to generate a power trend signal; and
a trend comparison circuit configured to operably generate a trend comparison result according to the current trend signal and the power trend signal, or according to the voltage trend signal and the power trend signal; and
a power output control circuit which is coupled to the photovoltaic device at an input terminal and extracts electric energy at the input terminal to generate the output current and the output voltage at an output terminal, the power output control circuit adjusts the power conversion from the input terminal to the output terminal directly or indirectly according to an output from the trend judgment circuit so that the input current approaches an optimum current of the photovoltaic device,
wherein the power trend indicator circuit includes:
a first and a second switches controlled by a clock signal;
a first capacitor coupled to a signal related to the input voltage through the first switch, configured to operably store the signal related to the input voltage when the first switch is conductive;
a second capacitor coupled to a signal related to the input current through the second switch, configured to operably store the signal related to the input current when the second switch is conductive;
a current source;
a first transistor controlled by the signal related to the input current at the previous time point and having one terminal coupled to the current source;
a second transistor controlled by the signal related to the input current at the present time point and having one terminal coupled to the current source, wherein the first and second transistors compete for distribution of a current of the current source;
a third and a fourth transistors controlled by the signal related to the input voltage at the present time point;
a fifth and a sixth transistors controlled by the signal related to the input voltage at the present time point, wherein each of the third and the fifth transistors has one terminal coupled to another terminal of the first transistor, and the third and the fifth transistors compete for distribution of a current flowing through the first transistor, and wherein each of the fourth and the sixth transistors has one terminal coupled to another terminal of the second transistor, and the fourth and the sixth transistors compete for distribution of a current flowing through the second transistor;
a first current mirror circuit obtaining a first sum of currents flowing through the third and the sixth transistors and duplicating the first sum to generate a first signal; and
a second current mirror circuit obtaining a second sum of currents flowing through the fourth and the fifth transistors and duplicating the second sum to generate a second signal;
wherein a comparison between the first signal and the second signal shows a power trend.

4. A photovoltaic power circuit with auto zero calibration, for converting an input current and an input voltage generated by a photovoltaic device to an output current and an output voltage, the photovoltaic power circuit comprising:
a trend judgment circuit having a storage mode and a comparison mode, the trend judgment circuit including:
a current trend indicator circuit configured to operably judge a slope direction of the input current at a present time point as compared with the input current at a previous time point in the comparison mode to generate a current trend signal, or a voltage trend indicator circuit configured to operably judge a slope direction of the input voltage at the present time point as compared with the input voltage at the previous time point in the comparison mode to generate a voltage trend signal;
a power trend indicator circuit configured to operably judge a slope direction of the power at the present time point as compared with the power at the previous time point according to the input current and the input voltage in the comparison mode to generate a power trend signal; and
a trend comparison circuit configured to operably generate a trend comparison result according to the current trend signal and the power trend signal, or according to the voltage trend signal and the power trend signal; and
a power output control circuit which is coupled to the photovoltaic device at an input terminal and extracts electric energy at the input terminal to generate the output current and the output voltage at an output terminal, the power output control circuit adjusts the power conversion from the input terminal to the output terminal directly or indirectly according to an output from the trend judgment circuit so that the input current approaches an optimum current of the photovoltaic device,
wherein the trend judgment circuit further includes a state-over-time integrator circuit configured to operably integrate the trend comparison result from the trend comparison circuit to generate a state-over-time integration output.

5. The photovoltaic power circuit according to claim 4, wherein the state-over-time integrator circuit includes:
a first current source coupled between a voltage supply and a common node, configured to operably supply charges;
a second current source coupled between the common node and ground, configured to operably discharge charges;
a capacitor having a high voltage terminal coupled to the common node;
a first switch coupled to the first current source, and configured to operably determine whether to charge the capacitor by the first current source according to the trend comparison result; and
a second switch coupled to the second current source, and configured to operably determine whether to discharge the capacitor by the second current source according to the trend comparison result.

6. The photovoltaic power circuit according to claim 5, wherein the state-over-time integrator circuit further includes a third switch coupled between the high voltage terminal of the capacitor and the common node, the third switch being controlled by a clock signal.

7. The photovoltaic power circuit according to claim 5, wherein the state-over-time integrator circuit further includes a source follower circuit coupled to the high voltage terminal of the capacitor and the common node.

8. The photovoltaic power circuit according to claim 5, wherein the state-over-time integrator circuit further includes an emitter follower circuit coupled to the high voltage terminal of the capacitor and the common node.

9. The photovoltaic power circuit according to claim 5, wherein the state-over-time integrator circuit further includes a voltage-controlled current source coupled to the high voltage terminal of the capacitor and controlled by the voltage of the capacitor.

10. The photovoltaic power circuit according to claim 5, wherein the state-over-time integrator circuit further includes a voltage-controlled resistor coupled to the high voltage terminal of the capacitor and controlled by the voltage of the capacitor.

11. The photovoltaic power circuit according to claim 4, further comprising a gain adjustment circuit coupled between the output of the state-over-time integrator circuit and the power output control circuit, and configured to operably adjust a weighting of the output from the state-over-time integrator circuit as a control factor to the power output control circuit.

12. The photovoltaic power circuit according to claim 11, wherein the state-over-time integration output from the state-over-time integrator circuit is a voltage signal, and the gain adjustment circuit is a voltage scaling circuit configured to operably multiply the state-over-time integration output by a first gain, or a voltage-to-current converter with an adjustable ratio and configured to operably multiply the state-over-time integration output by a second gain and converting the product to a current signal.

13. The photovoltaic power circuit according to claim 11, wherein the state-over-time integration output from the state-over-time integrator circuit is a current signal, and the gain adjustment circuit is a current scaling circuit configured to operably multiply the state-over-time integration output by a first gain, or a current-to-voltage converter with an adjustable ratio and configured to operably multiply the state-over-time integration output by a second gain and converting the product to a voltage signal.

* * * * *